US011901619B2

(12) United States Patent
Best et al.

(10) Patent No.: US 11,901,619 B2
(45) Date of Patent: Feb. 13, 2024

(54) RADOME WITH CERAMIC MATRIX COMPOSITE

(71) Applicant: The Boeing Company, Chicago, IL (US)

(72) Inventors: Michael J. Best, Chicago, IL (US); Robert A. DiChiara, Chicago, IL (US); Brian L. Muench, Chicago, IL (US); Vann Heng, Chicago, IL (US); Jonathan D. Embler, Chicago, IL (US); Thomas R. Pinney, Chicago, IL (US); Holly M. O'Brien, Chicago, IL (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/553,238

(22) Filed: Dec. 16, 2021

(65) Prior Publication Data

US 2023/0198137 A1 Jun. 22, 2023

(51) Int. Cl.
*H01Q 1/42* (2006.01)

(52) U.S. Cl.
CPC .................................... *H01Q 1/42* (2013.01)

(58) Field of Classification Search
CPC ............ H01Q 1/42; H01Q 1/12; H01Q 1/281
See application file for complete search history.

(56) References Cited

U.S. PATENT DOCUMENTS

| | | | | |
|---|---|---|---|---|
| 2,962,717 A * | 11/1960 | Kofoid | H01Q 1/422 | 29/527.3 |
| 3,481,010 A * | 12/1969 | Hallse | B28B 7/346 | 425/96 |
| 5,408,244 A * | 4/1995 | Mackenzie | H01Q 1/422 | 343/873 |
| 7,681,834 B2 * | 3/2010 | Facciano | F41G 7/2286 | 244/119 |
| 8,328,453 B2 | 12/2012 | Keith et al. | | |
| 8,765,230 B1 * | 7/2014 | Waldrop, III | H01Q 1/02 | 343/872 |
| 9,419,333 B1 | 8/2016 | Muench et al. | | |
| 9,577,323 B2 * | 2/2017 | Renilson | H01Q 15/16 | |
| 9,647,330 B1 | 5/2017 | DiChiara | | |
| 9,711,845 B2 | 7/2017 | Pinney et al. | | |

(Continued)

FOREIGN PATENT DOCUMENTS

| | | | | |
|---|---|---|---|---|
| CN | 209249673 U * | 8/2019 | H01Q 1/12 |
| CN | 113732996 A * | 12/2021 | |

(Continued)

*Primary Examiner* — Dimary S Lopez Cruz
*Assistant Examiner* — Jordan E. DeWitt
(74) *Attorney, Agent, or Firm* — McDonnell Boehnen Hulbert & Berghoff LLP

(57) ABSTRACT

In a first example, a radome includes a shell including a ceramic matrix composite, the shell forming a first hole at a forward end of the shell and a second hole at an aft end of the shell. The radome also includes a fluid impervious coating on the shell. In a second example, a vehicle includes a main body, the radome, and an attachment assembly that couples the radome to the main body. In a third example, a method includes forming a shell comprising a ceramic matrix composite using a wet layup process, applying a fluid impervious coating onto the shell, and curing the shell and the fluid impervious coating.

20 Claims, 16 Drawing Sheets

(56) References Cited

U.S. PATENT DOCUMENTS

| | | | | |
|---|---|---|---|---|
| 10,347,982 | B2 | 7/2019 | Muench et al. | |
| 10,581,151 | B2 | 3/2020 | DiChiara et al. | |
| 2007/0228211 | A1 * | 10/2007 | Facciano | F41G 7/2246 244/3.19 |
| 2009/0152135 | A1 * | 6/2009 | Mason | F41F 3/073 206/204 |
| 2011/0124483 | A1 * | 5/2011 | Shah | C04B 35/584 252/502 |
| 2014/0299712 | A1 * | 10/2014 | Waldrop, III | H01Q 1/422 244/121 |
| 2015/0191256 | A1 * | 7/2015 | Ferguson | H01Q 1/42 244/129.1 |
| 2016/0020512 | A1 * | 1/2016 | Pinney | H01Q 1/42 343/705 |
| 2017/0264009 | A1 * | 9/2017 | Worthen | B32B 27/12 |
| 2019/0305408 | A1 * | 10/2019 | Chao | H01Q 1/286 |
| 2021/0288413 | A1 * | 9/2021 | Wright | H01Q 17/001 |

FOREIGN PATENT DOCUMENTS

| | | | | |
|---|---|---|---|---|
| EP | 3159652 | A1 * | 4/2017 | C04B 35/10 |
| WO | WO-2010117474 | A2 * | 10/2010 | H01Q 1/142 |

* cited by examiner

RADOME WITH CERAMIC MATRIX COMPOSITE

FIELD

The present disclosure generally relates to a radome, and more specifically to a radome formed with a ceramic matrix composite.

BACKGROUND

A radome is a structural enclosure that protects a radar antenna. For high speed vehicles (e.g., aircraft) that have a radar antenna, radomes are often formed of silicon nitride ($Si_3N_4$), which has several limitations. First, current processes for shaping silicon nitride are generally monolithic (e.g., void of reinforcement techniques), making the material more brittle for handling, machining, and drilling holes for attachments. Thus, machining $Si_3N_4$ materials is costly and has a practical limit for how large of a component can be manufactured, which limits design flexibility of radomes. Second, $Si_3N_4$ radomes are typically bonded to a vehicle with glass or ceramic adhesive which is a complex process. Such bond joints are typically permanent in nature, which hampers the ability to repair a radar antenna within the radome or to inspect the interior of the radome. Also, $Si_3N_4$ is brittle, vulnerable to thermal shock incurred during high speed travel, and has higher transmission loss for radio frequencies (RF) utilized by the radar antenna when the vehicle travels at high speeds that heat the $Si_3N_4$.

SUMMARY

One aspect of the disclosure is a radome comprising a shell comprising a ceramic matrix composite, the shell forming a first hole at a forward end of the shell and a second hole at an aft end of the shell; and a fluid impervious coating on the shell.

Another aspect of the disclosure is a vehicle comprising: a main body; a radome comprising: a shell comprising a ceramic matrix composite, the shell forming a first hole at a forward end of the shell and a second hole at an aft end of the shell; and a fluid impervious coating on the shell; and an attachment assembly that couples the radome to the main body.

Another aspect of the disclosure is a method of forming a radome, the method comprising: forming a shell comprising a ceramic matrix composite using a wet layup process; applying a fluid impervious coating onto the shell; and curing the shell and the fluid impervious coating.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

A need exists for a radome that is formed of a material that is easier and less costly to process, that can be more easily attached and removed from a vehicle, that has desirable transmission characteristics with respect to radio frequencies (RF), and is able to withstand harsh flight environments such as high heat and structural loads, rain or hail impact, tool drop, and handling. Examples herein include a radome that includes a shell including (e.g., formed of) a ceramic matrix composite (CMC). The shell forms a first hole at a forward end of the shell and a second hole at an aft end of the shell. The aft end of the shell can be placed over a radar antenna and attached to a vehicle. The radome also includes a fluid impervious coating on the shell to keep the radar antenna isolated from moisture, vapors, liquids (e.g., rain), or hot gases present during operation (e.g., hot gases generated via friction of the aircraft body with air during high speed flight).

In some examples, the shell has an aerodynamic conical shape. When compared to $Si_3N_4$, the CMC is easier to form and process, and generally provides enhanced structural stability and exhibits stable RF transmission with low losses caused by temperature variations. Additionally, the CMC can be attached to a vehicle via fasteners to facilitate easier removal for maintenance and inspection.

Disclosed examples will now be described more fully hereinafter with reference to the accompanying Drawings, in which some, but not all of the disclosed examples are shown.

Indeed, several different examples may be described and should not be construed as limited to the examples set forth herein. Rather, these examples are described so that this disclosure will be thorough and complete and will fully convey the scope of the disclosure to those skilled in the art.

Figure 1:
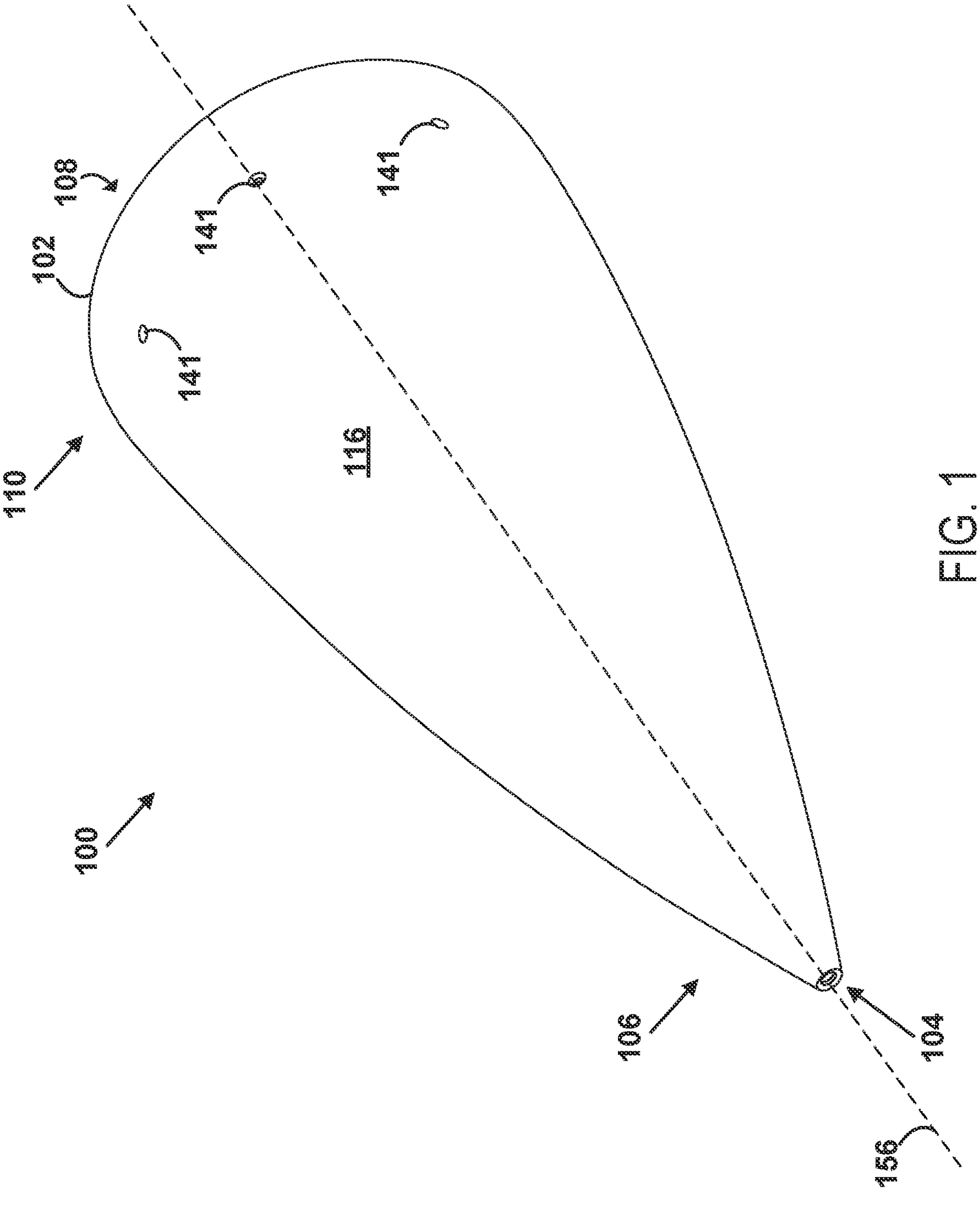
FIG. 1 is a perspective view of a forward end of a radome, according to an example.

FIG. 1 is a perspective view of a forward end 106 of a radome 100 (e.g., of a shell 102). The radome 100 includes the shell 102 that includes (e.g., is formed of) a ceramic matrix composite (CMC). The shell 102 forms a first hole 104 at the forward end 106 of the shell 102 and a second hole 108 at an aft end 110 of the shell 102. The radome 100 also includes a fluid impervious coating on an outer surface 116 of the shell 102 (e.g., on an entirety of the outer surface 116). The outer surface 116 can be defined as facing away from an axis 156 (e.g., a longitudinal axis of the shell 102 and of the radome 100). The first hole 104 and the second hole 108 are aligned on the axis 156. The shell 102 also includes holes 141 that are formed via drilling after formation of the shell 102. The holes 141 are configured to receive respective fasteners as discussed below. The fluid impervious coating is shown in more detail in FIG. 6, FIG. 8, and FIG. 12.

As shown, the shell 102 has a hollow and somewhat conical shape. The first hole 104 is smaller than the second hole 108 (e.g., to form an aerodynamic shape of the shell 102 that can be placed over a radar antenna via the second hole 108). The CMC includes ceramic fibers (e.g., ceramic oxide fibers) reinforced in a ceramic matrix (e.g., a ceramic oxide matrix). The ceramic fibers and the ceramic matrix can each include any ceramic material that is substantially RF transparent. For example, the ceramic fibers and the ceramic matrix can each include any materials that are (e.g., inorganic) non-metallic oxides such as alumina, silica, an alumina-silicate compound mixture, or cordierite. When compared to silicon nitride, the (e.g., oxide) CMC generally has a lower dielectric coefficient and is more transmissive for RF frequencies. The oxide CMC radome materials have a substantially stable dielectric constant of approximately 5 and a stable low loss tangent (e.g., <0.01 or <0.02) from 2 GHz to 40 GHz. The dielectric constant of the oxide CMC materials is generally stable with respect to temperature, even up to temperatures of 1800° F. That is, a signal transmitted or received by a radar antenna under the radome 100 will typically not be significantly attenuated as the signal passes through the radome 100. The materials of the shell 102 generally have a dielectric constant of 5 or 6 or less.

One way of forming the CMC is to infiltrate a ceramic precursor solution that includes fine ceramic particles into oxide ceramic fibers preform to produce ceramic prepreg. The ceramic prepreg can be formed on a tool surface or mold having the geometry of the shell 102. Additional details regarding how the radome 100 is formed, including details about the fluid impervious coating, are discussed below with reference to FIG. 6.

Figure 2:
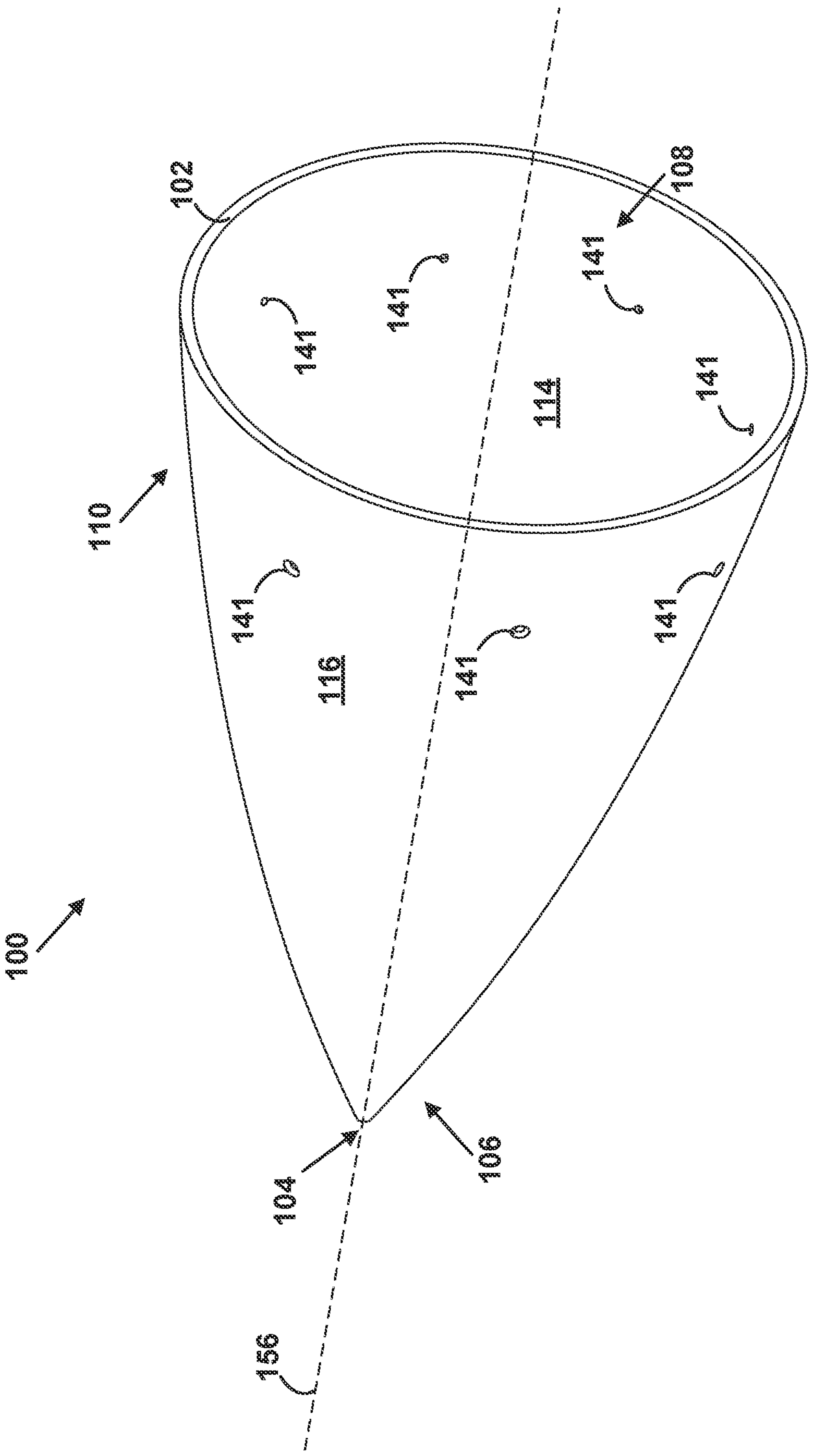
FIG. 2 is a perspective view of an aft end of a radome, according to an example.

FIG. 2 is a perspective view of the aft end 110 of the radome 100 (e.g., of the shell 102). As shown, the aft end 110 forms the largest diameter of the radome 100 (e.g., of the shell 102) with respect to the axis 156. The aft end 110 has an annular shape. Also shown in FIG. 2 is an inner surface 114 of the shell 102. The inner surface 114 can be defined as facing toward the axis 156.

Figure 3:
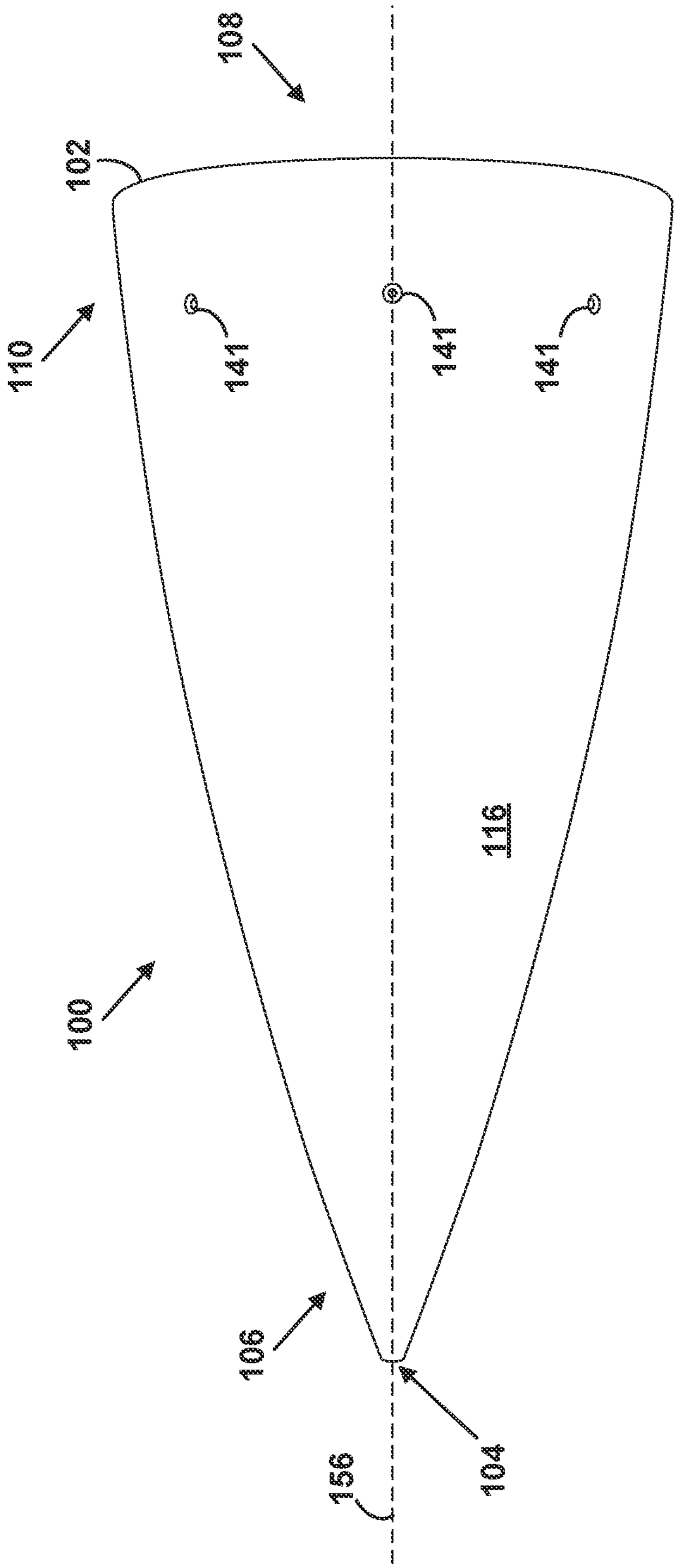
FIG. 3 is a side view of a radome, according to an example.

FIG. 3 is a side view of the radome 100.

Figure 4:
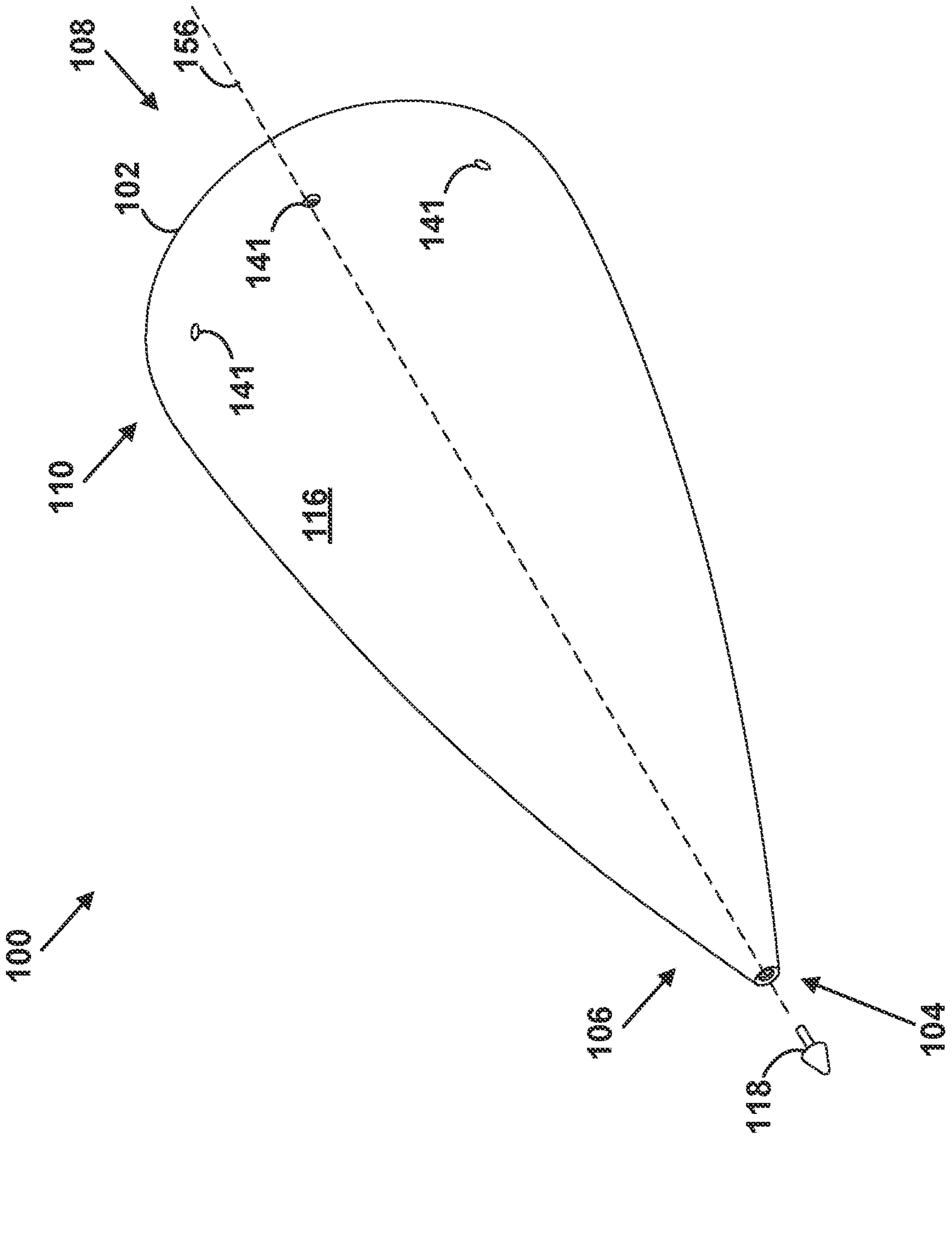
FIG. 4 is a perspective view of a forward end of a radome, according to an example.

FIG. 4 is a perspective view of the forward end 106 of the radome 100. A tip 118 of the radome 100 is shown disassembled from the shell 102. The tip 118 is formed of a ceramic material, such as silicon nitride or alumina. Using such materials for the tip 118 can provide similar thermal expansion properties for the tip 118 and the shell 102.

Figure 5:
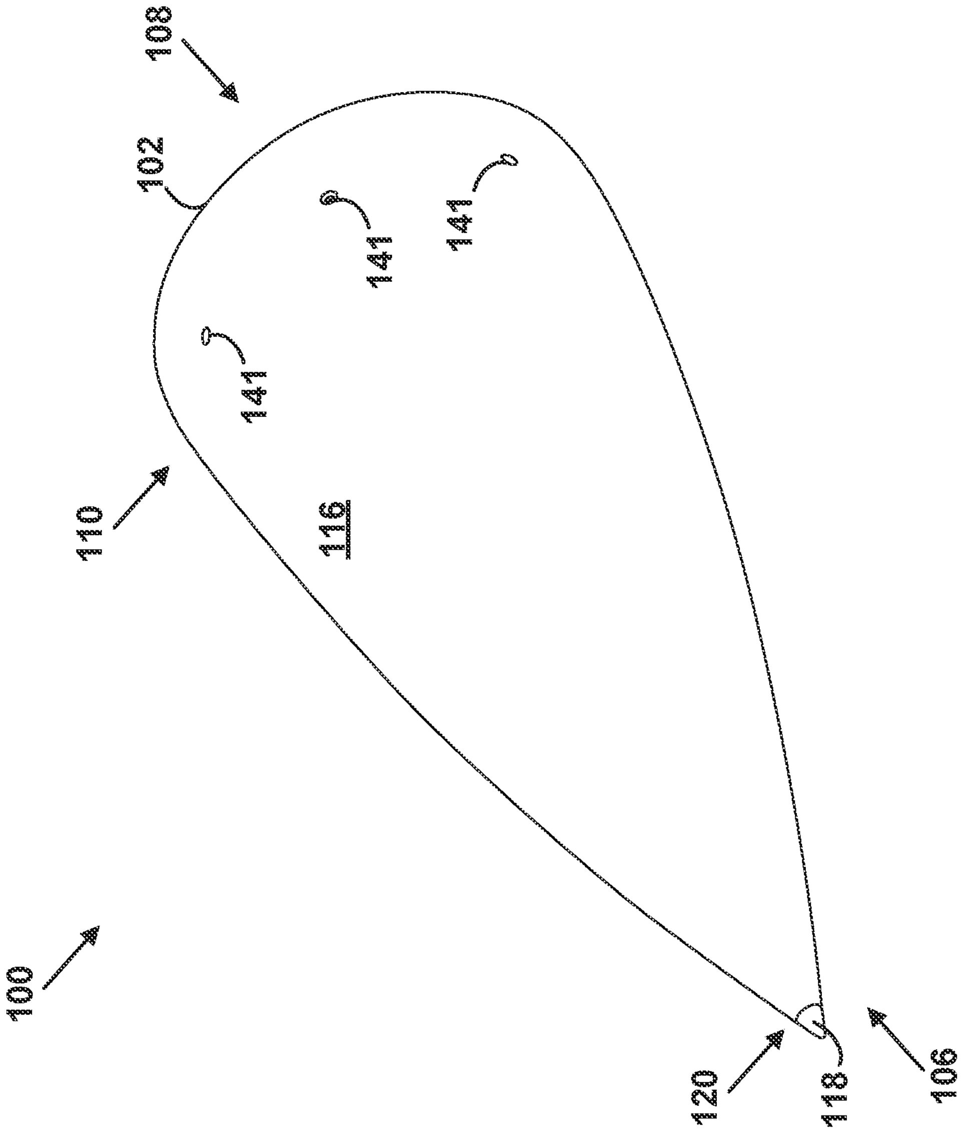
FIG. 5 is a perspective view of a forward end of a radome, according to an example.

FIG. 5 is a perspective view of the forward end 106 of the radome 100, showing the tip 118 placed within the first hole 104 to form a fluid tight seal 120 with the shell 102 over the first hole 104 (e.g., to prevent fluid from leaking into the shell 102 via the first hole 104). The tip 118 also forms an aerodynamic surface with the shell 102.

Figure 6:
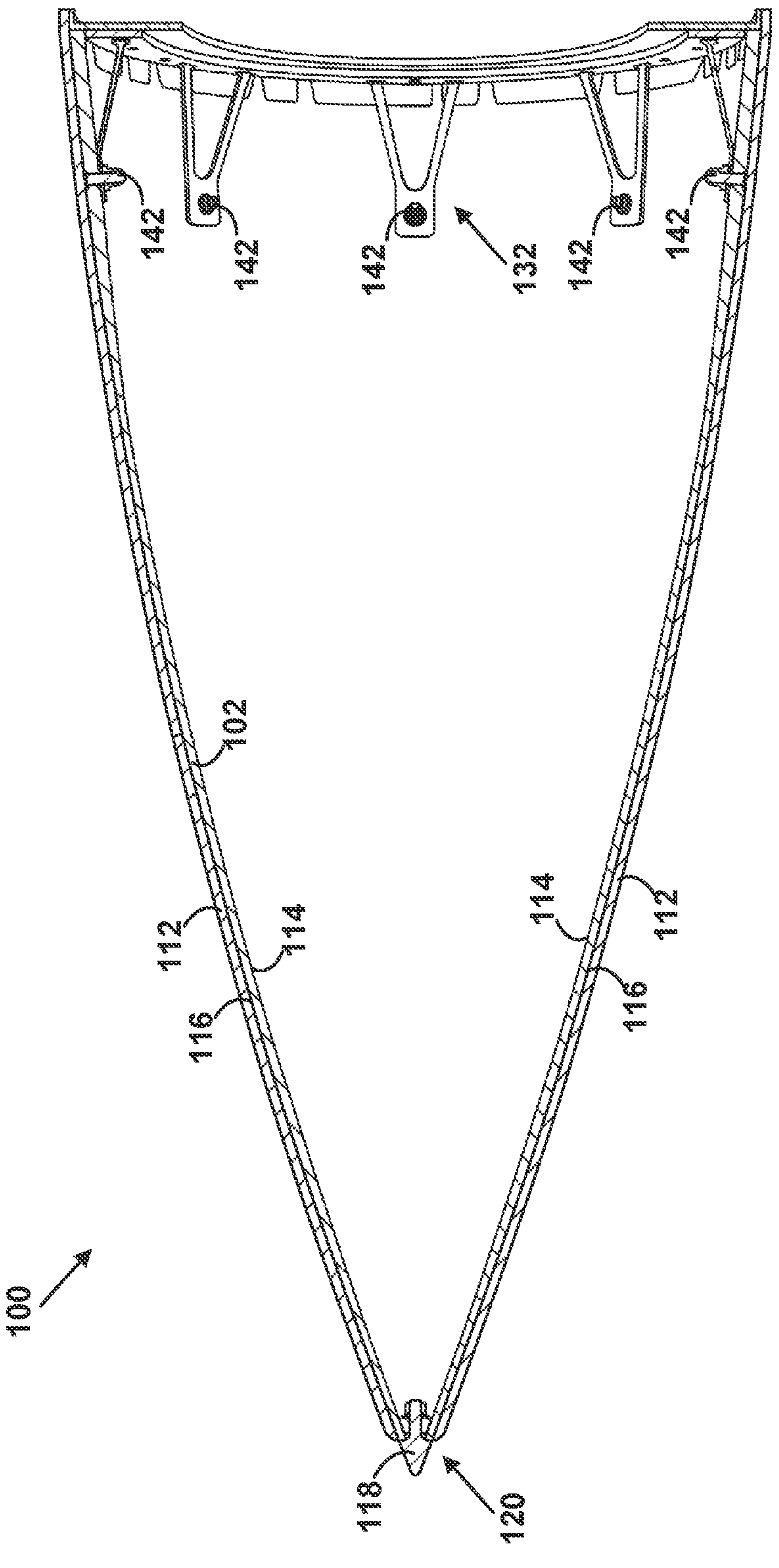
FIG. 6 is a cross sectional view of a radome and an attachment assembly, according to an example.

FIG. 6 is a cross sectional view of the radome 100. In particular, FIG. 6 shows the inner surface 114 of the shell 102, the outer surface 116 of the shell 102, and the fluid impervious coating 112. The fluid impervious coating 112 can be a sintered glass layer with transmission properties similar to that of the material of the shell 102. As shown, the fluid impervious coating 112 covers an entirety of the outer surface 116. The radome 100 also includes an attachment assembly 132 configured to couple the shell 102 to a vehicle 200 (discussed in more detail below). In FIG. 6, the thickness of the fluid impervious coating 112 is exaggerated for purposes of illustration. In practice, the thickness of the fluid impervious coating 112 is generally much smaller than a thickness of the shell 102 (e.g., a distance between the outer surface 116 and the inner surface 114). For example, the thickness of the shell 102 generally ranges from 0.1 inches to 0.25 inches and the thickness of the fluid impervious coating 112 generally ranges from 0.005 to 0.01 inches.

The shell 102 can be formed by using a wet layup process. That is, a stack of ceramic prepreg including the ceramic fibers and ceramic matrix can be placed over a conical mold to form a desired radial thickness of the CMC over the mold (e.g., a forming tool). The stacked ceramic prepregs are consolidated to each other via vacuum and autoclave pressure during cure while on the conical mold and heated to an intermediate temperature (e.g., 180-350° F.) until a solid structure is formed (e.g., the shell 102). Then, the shell 102 is removed from the mold and processed and cured to a high temperature (e.g., 350-2000° F.) in a furnace. The shell 102 can then be machined to fine tune the dimensions of the shell 102 as desired.

After the shell 102 is formed, there are at least two ways to apply the fluid impervious coating 112 onto the outer surface 116 of the shell 102. One way is to apply the fluid impervious coating 112 after the autoclave cure of the shell 102 (e.g., at intermediate temperature) and then co-process the fluid impervious coating 112 and the shell 102 to a high temperature in a furnace. Another way is to apply the fluid impervious coating 112 after the high-temperature post processing of the shell 102 and repeat the high-temperature post processing for the fluid impervious coating 112. For example, the fluid impervious coating 112 can be brushed onto or sprayed onto the shell 102. The fluid impervious coating 112 can also be machined to reduce a thickness 208 of the fluid impervious coating 112 after the curing.

Figure 7:
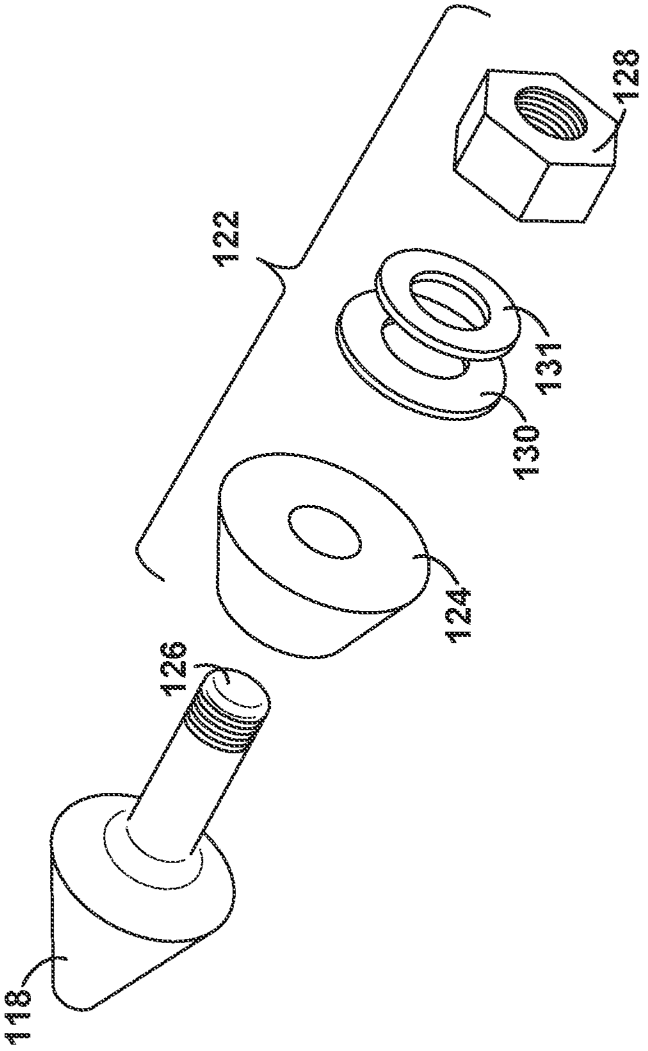
FIG. 7 is an exploded view of a fastening assembly and a tip, according to an example.
Figure 8:
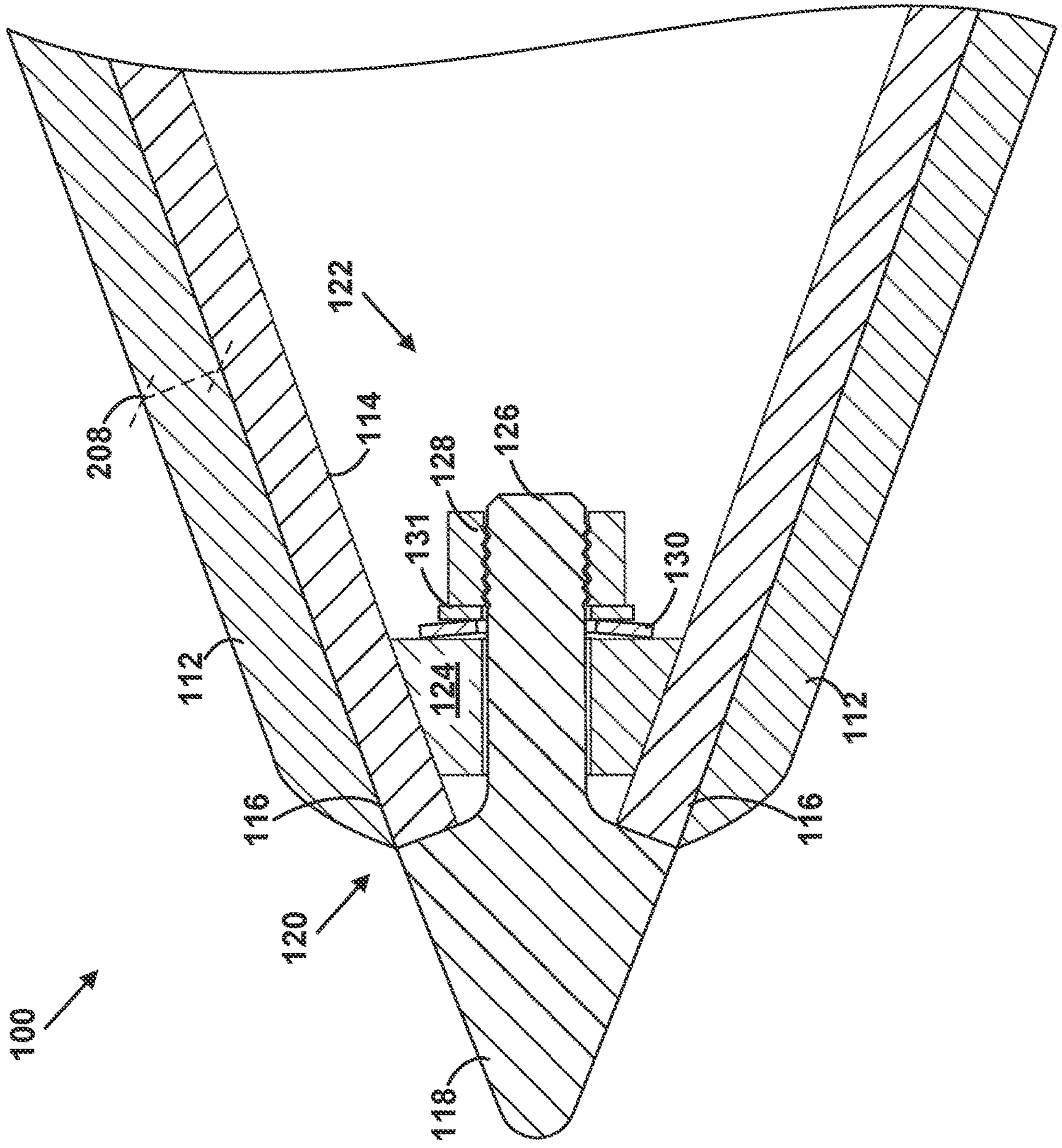
FIG. 8 is a close up cross sectional view of a radome, according to an example.

FIG. 7 is an exploded view of a fastening assembly 122 and the tip 118. The radome 100 includes the fastening assembly 122 that mechanically fastens the tip 118 to the shell 102 as is shown in FIG. 8. The fastening assembly 122 is configured to receive an aft end 126 of the tip 118. The aft end 126 generally includes male threads. The fastening assembly 122 includes a bushing 124, a spring element 130 (e.g., a Belleville washer), a washer 131, and a fastener 128 (e.g., a nut having female threads that mate with the male threads of the aft end 126).

FIG. 8 is a close up cross sectional view of the radome 100. The fastening assembly 122 includes the bushing 124 that conforms to the inner surface 114 of the shell 102 (e.g., to prevent radial movement of the aft end 126 of the tip 118).

That is, the bushing 124 includes a radially outward facing surface that has the same shape as the inner surface 114. The bushing 124 is configured to receive the aft end 126 of the tip 118. Also, the fastener 128 is configured to mate with the aft end 126 of the tip 118 to hold the tip 118 against the shell 102 over the first hole 104. The spring element 130 is positioned between the fastener 128 and the bushing 124 (e.g., between the washer 131 and the bushing 124) and is configured to receive the aft end 126 of the tip 118. The spring element 130 is also configured to flex to maintain a preload on the shell 102 and/or the tip 118 during thermal expansion of the shell 102 or during thermal contraction of the shell 102.

Starting at the tip 118, the thickness 208 of the fluid impervious coating 112 is shown to increase moving in the aft direction. However, this is a result of the exaggerated thickness 208 shown in FIG. 8 and is not necessarily present in practice.

Figure 9:
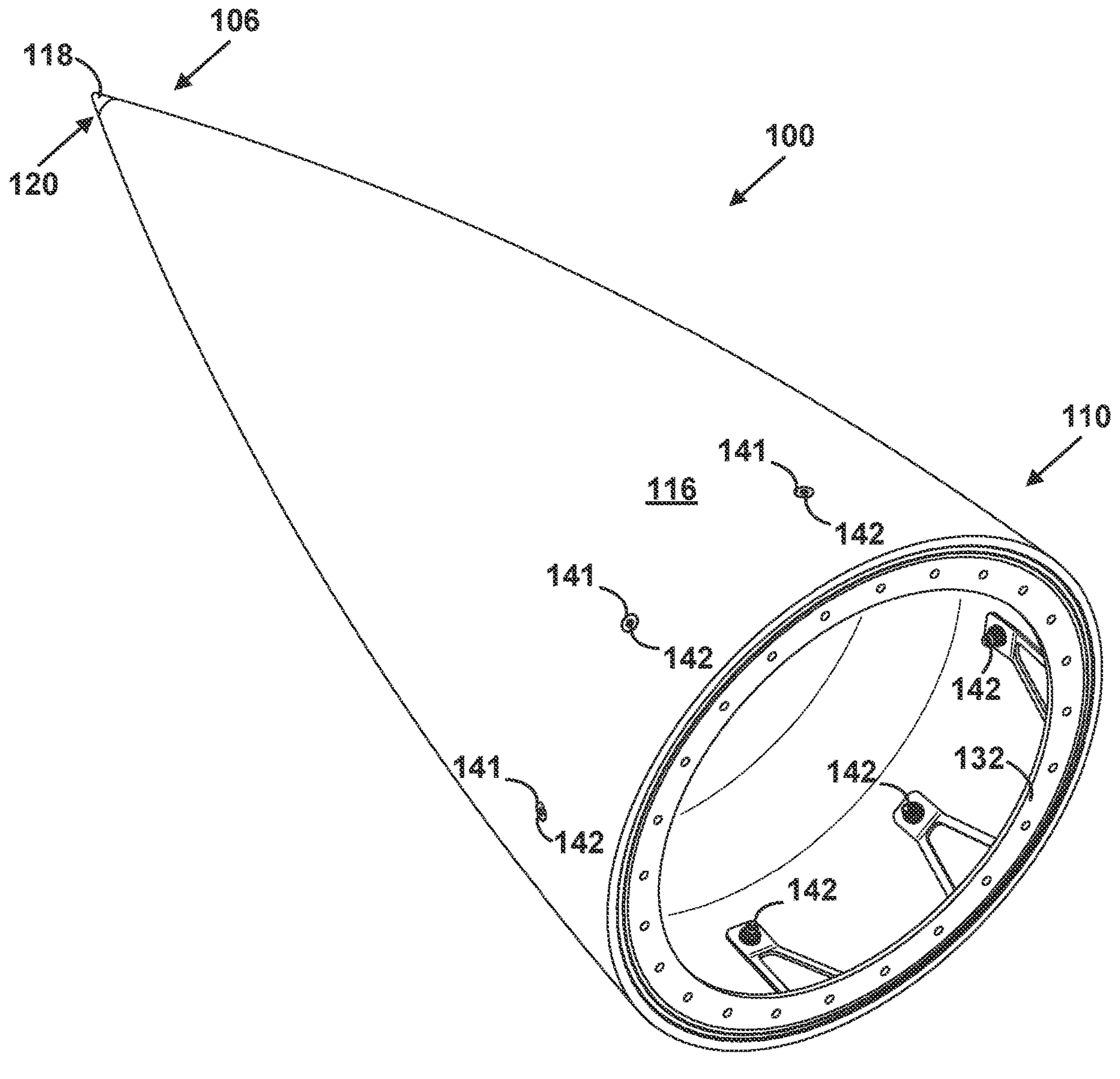
FIG. 9 is a perspective view of an aft end of a radome, according to an example.

FIG. 9 is a perspective view of the aft end 110 of the radome 100, showing the attachment assembly 132.

Figure 10:
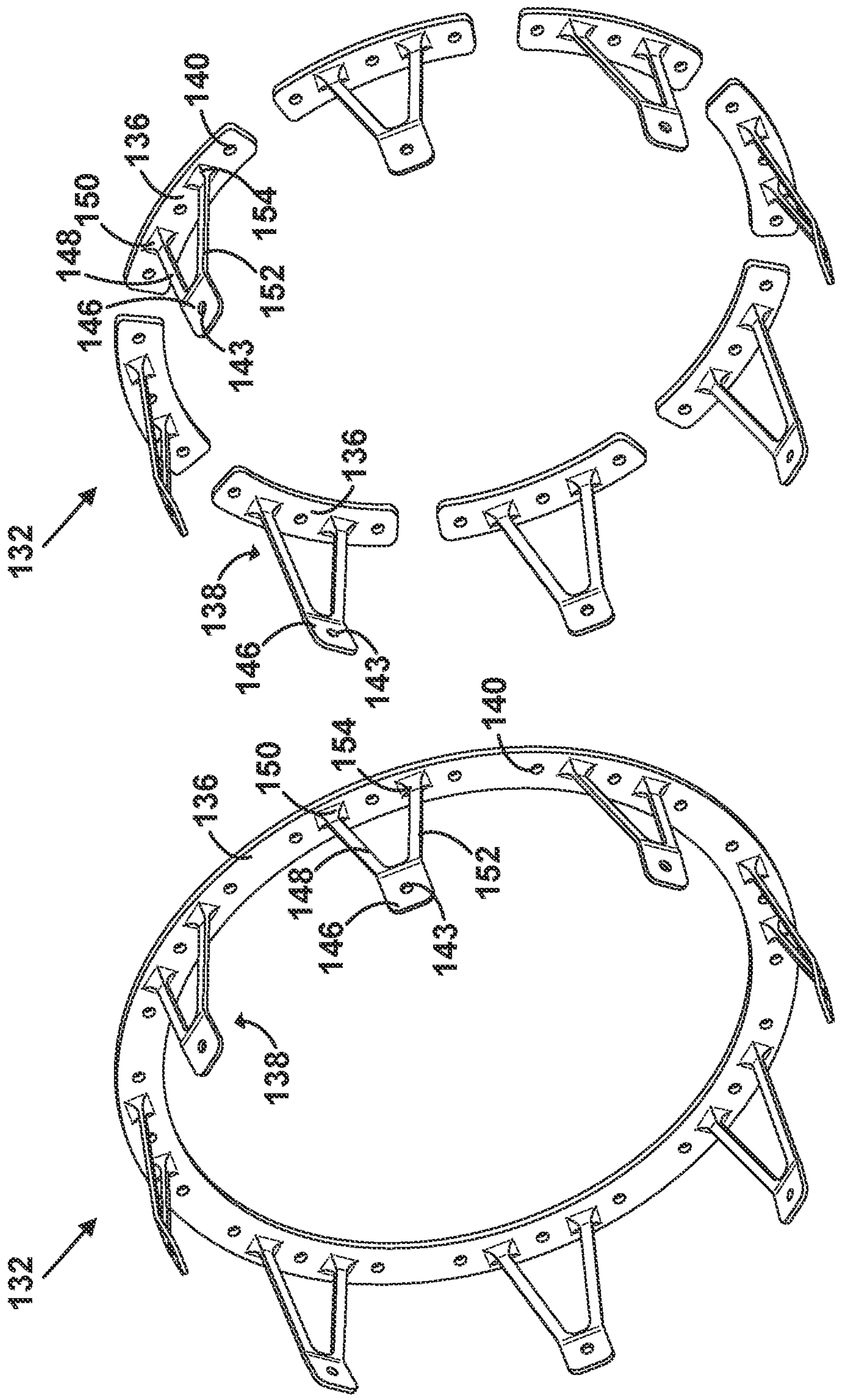
FIG. 10 is a perspective view of attachment assemblies, according to an example.

FIG. 10 is a perspective view of attachment assemblies 132. The attachment assembly 132 on the left is formed of a singular piece of material (e.g., a metal such as a titanium alloy, or a superalloy such as Inconel® 718) whereas the attachment assembly 132 on the right is formed of eight separate pieces (e.g., metal). The attachment assembly 132 on the left might be stronger than the attachment assembly 132 on the right, however, the attachment assembly 132 on the right might be lighter than the attachment assembly 132 on the left.

Both attachment assemblies 132 include an annular component 136 configured to be attached to the vehicle 200 (e.g., via fasteners) and a bipod component 138 configured to attach the annular component 136 to the shell 102. The bipod components 138 are generally machined (e.g., integrally formed with the annular component 136 via subtractive manufacturing). The annular component 136 forms several holes 140 that are each configured to receive a fastener that attaches the annular component 136 to the vehicle 200. Each bipod component 138 also forms a hole 143 configured to receive a fastener that attaches the bipod component 138 (e.g., the annular component 136) to the shell 102.

In particular, the bipod component 138 includes a joint 146 that forms a hole 143 configured to receive a fastener and a first leg 148 that couples the joint 146 to a first attachment point 150 on the annular component 136. The bipod component 138 also includes a second leg 152 that couples the joint 146 to a second attachment point 154 on the annular component 136. The first leg 148 is machined to form the joint 146 with the second leg 152. The first attachment point 150 and the second attachment point 154 are machined joints between the annular component 136 and the first leg 148 or the second leg 152, respectively.

Figure 11:
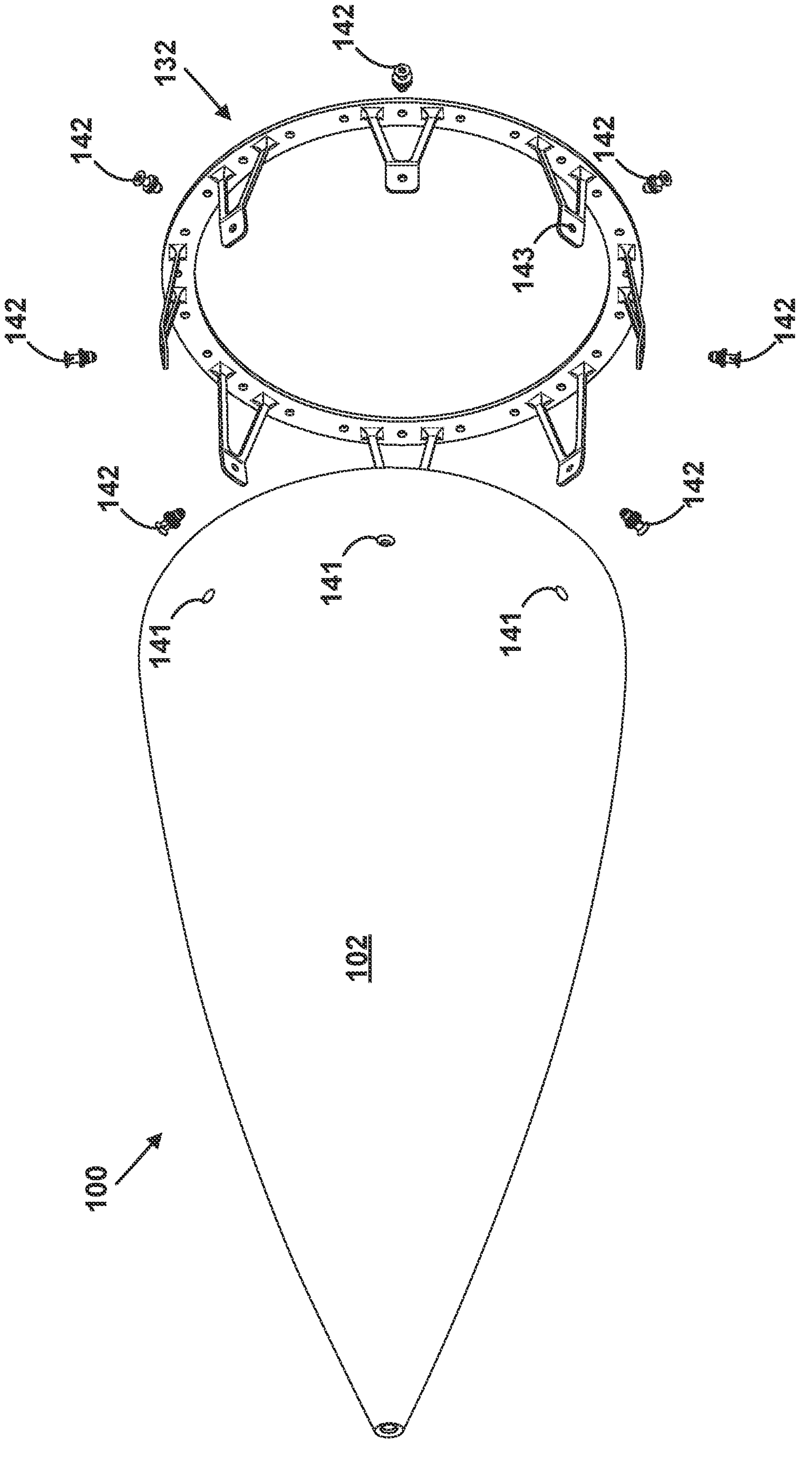
FIG. 11 is an exploded view of a radome and an attachment assembly, according to an example.

FIG. 11 is an exploded view of the radome 100, fasteners 142, and the attachment assembly 132. The fasteners 142 can be inserted through holes 141 in the shell 102 and holes 143 in the joints 146 to secure the attachment assembly to the shell 102.

Figure 12:
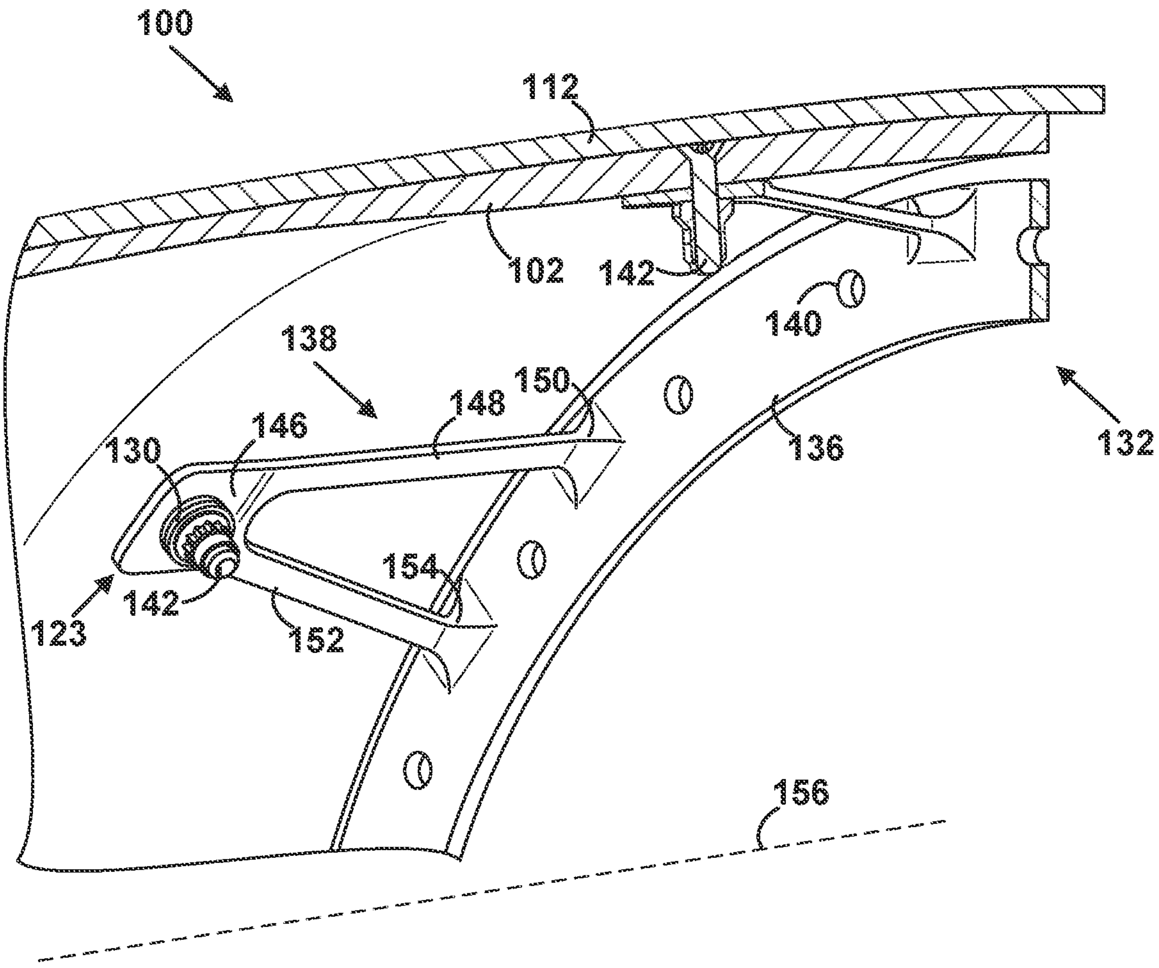
FIG. 12 is a cross sectional view of a radome and an attachment assembly, according to an example.

FIG. 12 is a cross sectional view of the radome 100 and the attachment assembly 132. The attachment assembly 132 is attached to the shell 102 via fasteners 142 (e.g., bolts or screws). For example, the fasteners 142 are inserted through (e.g., drilled) holes 141 in the shell 102 and through the holes 143 in the joint 146 of the bipod component 138. In some examples, the fluid impervious coating 112 surrounds and covers holes 141 within the shell 102 and surrounds and covers several fasteners 142 that fasten the shell 102 to respective joints 146 through the holes 141 in the shell 102. In some examples, the fluid impervious coating 112 extends into the holes 141 (e.g., through an entirety of each of the holes 141 in the shell 102).

The bipod component 138 generally exhibits more flexibility perpendicular to the axis 156 (e.g., in the radial direction) than parallel to the axis 156 (e.g., in the longitudinal direction) which will help accommodate potential thermal expansion of the shell 102.

The radome 100 also includes a fastening assembly 123 that includes a spring element 130 (e.g., a Belleville washer) that is configured to maintain a preload on the shell 102 and the bipod component 138 during thermal expansion of the shell 102 or during thermal contraction of the shell 102.

Figure 13:
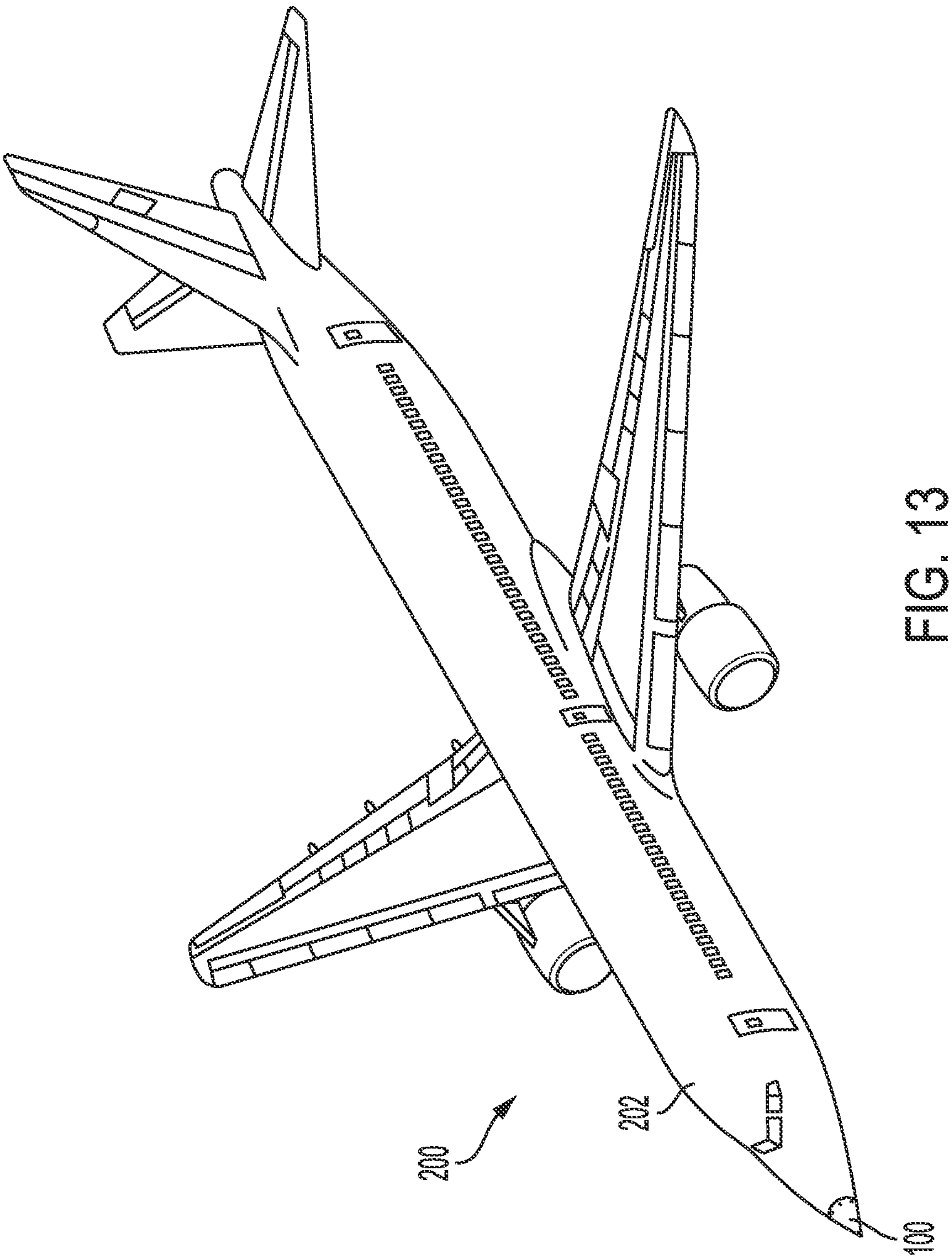
FIG. 13 is a perspective view of a radome and a vehicle, according to an example.

FIG. 13 is a perspective view of the radome 100 and the vehicle 200. The vehicle 200 includes a main body 202, the radome 100, and the attachment assembly 132 that couples the radome 100 to the main body 202. As shown, the vehicle 200 can be a commercial airliner with a nose mounted radar antenna covered by the radome 100, but other examples are possible, such as an automobile, a boat, or an unmanned aerial vehicle (UAV).

Figure 14:
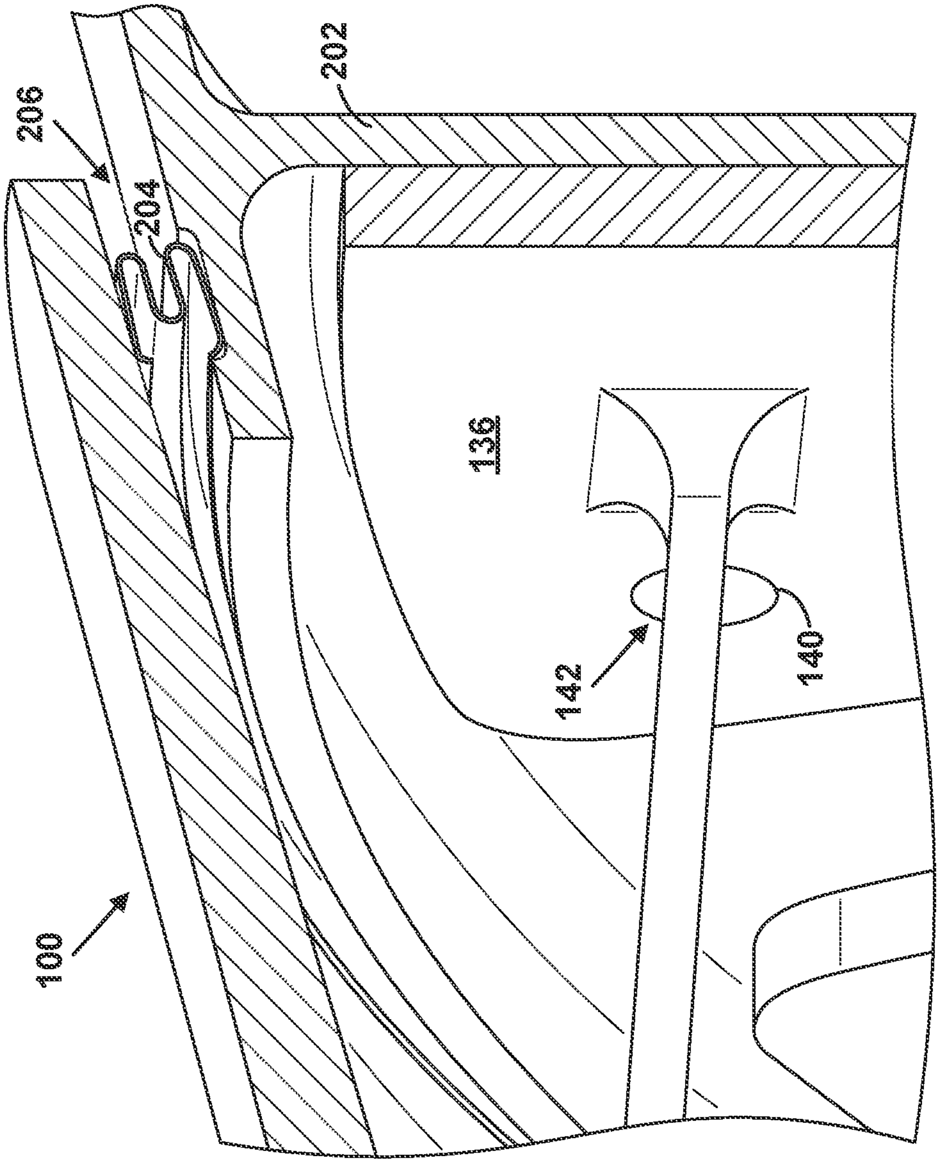
FIG. 14 is a cross sectional view of a radome and a vehicle, according to an example.

FIG. 14 is a cross sectional view of the radome 100 and the main body 202 of the vehicle 200. As shown, fasteners 142 are inserted through the holes 140 in the annular component 136 to attach the attachment assembly 132 to the main body 202 of the vehicle 200. The vehicle 200 also includes a metallic gasket 204 that forms a fluid impervious seal 206 between the radome 100 and the main body 202 (e.g., to prevent fluid leakage into the shell 102). FIG. 14 shows an example where the metallic gasket 204 is tensioned in the radial direction.

Figure 15:
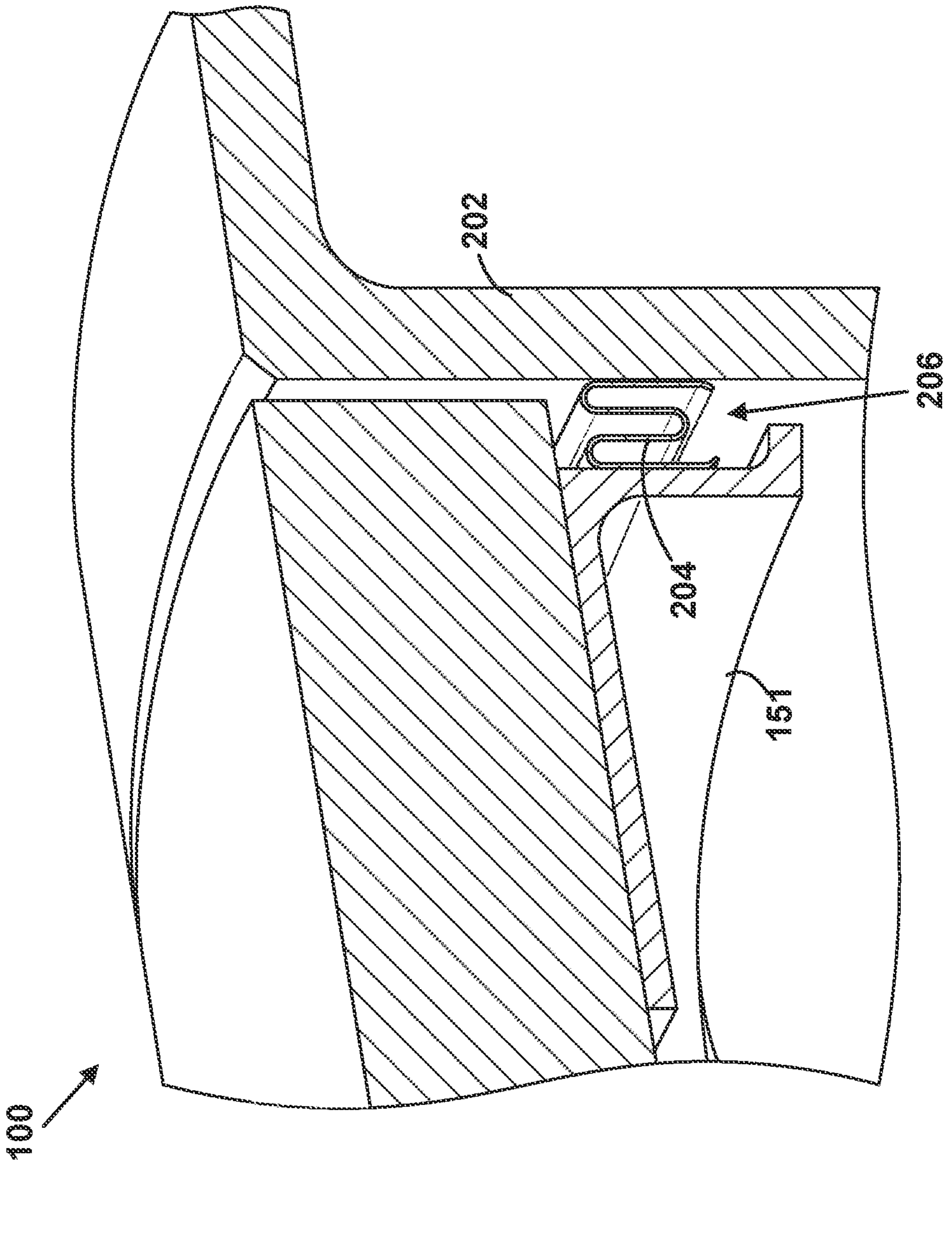
FIG. 15 is a cross sectional view of a radome and a vehicle, according to an example.

FIG. 15 is also a cross sectional view of the radome 100 and the main body 202 of the vehicle 200. FIG. 15 shows an example where the metallic gasket 204 is tensioned in the longitudinal direction between a retainer 151 and the main body 202, but nonetheless forms the fluid impervious seal 206 between the radome 100 (e.g., the retainer 151) and the main body 202.

Figure 16:
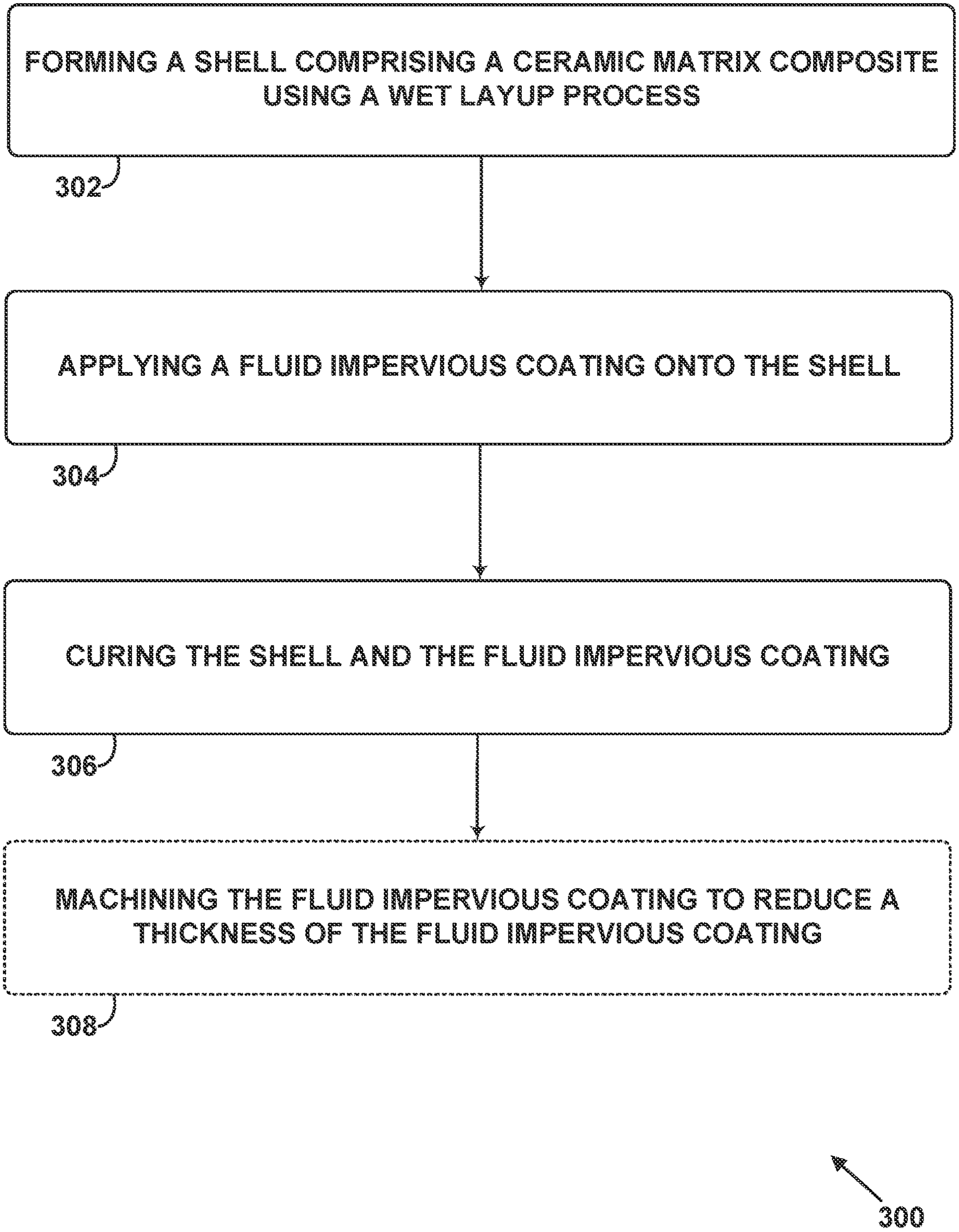
FIG. 16 is a block diagram of a method, according to an example.

FIG. 16 is a block diagram of a method 300 for forming a radome. As shown in FIG. 16, the method 300 includes one or more operations, functions, or actions as illustrated by blocks 302, 304, 306, and 308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes forming the shell 102 comprising the ceramic matrix composite using a wet layup process. Block 302 is described above with respect to FIG. 6.

At block 304, the method 300 includes applying the fluid impervious coating 112 onto the shell 102. Block 304 is also described above with respect to FIG. 6.

At block 306, the method 300 includes curing the shell 102 and the fluid impervious coating 112. Block 306 is also described above with respect to FIG. 6.

At block 308, the method 300 includes machining the fluid impervious coating 112 to reduce the thickness 208 of the fluid impervious coating 112 after the curing. Block 308 is also described above with respect to FIG. 6.

Examples of the present disclosure can thus relate to one of the enumerated clauses (ECs) listed below.

EC 1 A radome comprising: a shell comprising a ceramic matrix composite, the shell forming a first hole at a forward end of the shell and a second hole at an aft end of the shell; and a fluid impervious coating on the shell.

EC 2 The radome of EC 1, wherein the shell comprises an inner surface and an outer surface, and wherein the fluid impervious coating covers an entirety of the outer surface.

EC 3 The radome of any of ECs 1-2, wherein the first hole is smaller than the second hole.

EC 4 The radome of any of ECs 1-3, further comprising a tip that forms a fluid tight seal with the shell over the first hole.

EC 5 The radome of EC 4, wherein the tip comprises a ceramic material.

EC 6 The radome of any of ECs 4-5, further comprising a fastening assembly that mechanically fastens the tip to the shell.

EC 7 The radome of EC 6, wherein the fastening assembly comprises: a bushing that conforms to an inner surface of the shell, wherein the bushing is configured to receive an aft end of the tip; and a fastener configured to mate with the aft end of the tip to hold the tip against the shell over the first hole.

EC 8 The radome of EC 7, further comprising a spring element between the fastener and the bushing, wherein the spring element is configured to receive the aft end of the tip.

EC 9 The radome of EC 8, wherein the spring element is configured to maintain a preload on the tip during thermal expansion of the shell or during thermal contraction of the shell.

EC 10 The radome of any of ECs 1-9, further comprising an attachment assembly configured to couple the shell to a vehicle.

EC 11 The radome of EC 10, wherein the attachment assembly comprises: an annular component configured to be attached to the vehicle; and a bipod component configured to attach the annular component to the shell.

EC 12 The radome of EC 11, wherein the annular component forms a hole configured to receive a fastener.

EC 13 The radome of any of ECs 11-12, wherein the bipod component forms a hole configured to receive a fastener.

EC 14 The radome of any of ECs 11-13, wherein the bipod component comprises: a joint that forms a hole configured to receive a fastener; a first leg that couples the joint to a first attachment point on the annular component; and a second leg that couples the joint to a second attachment point on the annular component.

EC 15 The radome of any of ECs 11-14, wherein the first hole and the second hole are aligned on an axis, and wherein the bipod component is more flexible perpendicular to the axis than parallel to the axis.

EC 16 The radome of any of ECs 11-15, further comprising a fastening assembly comprising a spring element that is configured to maintain a preload on the shell and the bipod component during thermal expansion of the shell or during thermal contraction of the shell.

EC 17 A vehicle comprising: a main body; a radome comprising: a shell comprising a ceramic matrix composite, the shell forming a first hole at a forward end of the shell and a second hole at an aft end of the shell; and a fluid impervious coating on the shell; and an attachment assembly that couples the radome to the main body.

EC 18 The vehicle of EC 17, further comprising a metallic gasket that forms a fluid impervious seal between the radome and the main body.

EC 19 A method of forming a radome, the method comprising: forming a shell comprising a ceramic matrix composite using a wet layup process; applying a fluid impervious coating onto the shell; and curing the shell and the fluid impervious coating.

EC 20 The method of EC 19, further comprising machining the fluid impervious coating to reduce a thickness of the fluid impervious coating after the curing.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A radome comprising:

a shell comprising a ceramic matrix composite, the shell forming a first hole at a forward end of the shell and a second hole at an aft end of the shell;

a fluid impervious coating on the shell;

an annular component configured to be attached to a vehicle at the aft end of the shell via a first fastener received through a third hole of the annular component; and a bipod component comprising:

a joint that is attached via a second fastener to the shell forward of the annular component;

a first leg extending aft from the joint, wherein the first leg is adjoined to the annular component; and a second leg extending aft from the joint, wherein the second leg is adjoined to the annular component.

2. The radome of claim 1, wherein the shell comprises an inner surface and an outer surface, and wherein the fluid impervious coating covers an entirety of the outer surface.

3. The radome of claim 1, wherein the first hole is smaller than the second hole.

4. The radome of claim 1, further comprising a tip that forms a fluid tight seal with the shell over the first hole.

5. The radome of claim 4, wherein the tip comprises a ceramic material.

6. The radome of claim 4, further comprising a fastening assembly that mechanically fastens the tip to the shell.

7. The radome of claim 6, wherein the fastening assembly comprises:

a bushing that conforms to an inner surface of the shell, wherein the bushing is configured to receive an aft end of the tip; and a third fastener configured to mate with the aft end of the tip to hold the tip against the shell over the first hole.

8. The radome of claim 7, further comprising a spring element between the third fastener and the bushing, wherein the spring element is configured to receive the aft end of the tip.

9. The radome of claim 8, wherein the spring element is configured to maintain a preload on the tip during thermal expansion of the shell or during thermal contraction of the shell.

10. The radome of claim 1, wherein the first hole and the second hole are aligned on an axis, and wherein the bipod component is more flexible perpendicular to the axis than parallel to the axis.

11. The radome of claim 1, further comprising a fastening assembly comprising a spring element that is configured to maintain a preload on the shell and the bipod component during thermal expansion of the shell or during thermal contraction of the shell.

12. A vehicle comprising:

a main body;

a radome comprising:

a shell comprising a ceramic matrix composite, the shell forming a first hole at a forward end of the shell and a second hole at an aft end of the shell;

a fluid impervious coating on the shell;

an annular component configured to be attached to the vehicle at the aft end of the shell via a first fastener received through a third hole of the annular component; and a bipod component comprising:

a joint that is attached via a second fastener to the shell forward of the annular component;

a first leg extending aft from the joint, wherein the first leg is adjoined to the annular component; and a second leg extending aft from the joint, wherein the second leg is adjoined to the annular component.

13. The vehicle of claim 12, further comprising a metallic gasket that forms a fluid impervious seal between the radome and the main body.

14. The radome of claim 1, wherein the annular component comprises a first surface that faces aft, wherein the first surface is configured to be attached to and contact a second surface of the vehicle that faces forward.

15. The radome of claim 1, wherein the ceramic matrix composite comprises ceramic fibers reinforced in a ceramic matrix.

16. The radome of claim 1, wherein the third hole is between the first leg and the second leg.

17. The vehicle of claim 12, wherein the ceramic matrix composite comprises ceramic fibers reinforced in a ceramic matrix.

18. The vehicle of claim 12, wherein the annular component comprises a first surface that faces aft, wherein the first surface is configured to be attached to and contact a second surface of the vehicle that faces forward.

19. The vehicle of claim 12, wherein the first hole is between the first leg and the second leg.

20. The vehicle of claim 12, wherein the first hole and the second hole are aligned on an axis, and wherein the bipod component is more flexible perpendicular to the axis than parallel to the axis.

* * * * *